United States Patent
Otto et al.

(10) Patent No.: US 6,539,794 B1
(45) Date of Patent: Apr. 1, 2003

(54) ARRANGEMENT FOR MEASURING THE LEVEL OF CONTENTS IN A CONTAINER

(76) Inventors: Johanngeorg Otto, Im Heimatwinkel 2/1, 73434 Aalen-Hofherrnweiler (DE); Wolfgang Lubcke, Hans-Thoma-Strasse 1, 79585 Steinen (DE)

( * ) Notice: Subject to any disclaimer, the term of this patent is extended or adjusted under 35 U.S.C. 154(b) by 0 days.

(21) Appl. No.: 09/388,673

(22) Filed: Sep. 2, 1999

Related U.S. Application Data

(63) Continuation of application No. 08/388,737, filed on Feb. 15, 1995, now Pat. No. 6,047,598.

(30) Foreign Application Priority Data

Feb. 18, 1994 (DE) ........................................ P 44 05 238

(51) Int. Cl.[7] ............................................ G01F 23/284
(52) U.S. Cl. ..................................... 73/290 V; 340/621
(58) Field of Search ............................ 73/290 V, 1 H; 340/621; 367/908

(56) References Cited

U.S. PATENT DOCUMENTS

| | | | |
|---|---|---|---|
| 3,614,318 A | 10/1971 | Klose | |
| 3,626,274 A | 12/1971 | Christofzik | 323/1 |
| 4,015,472 A | 4/1977 | Herzl | 73/194 B |
| 4,095,064 A | 6/1978 | Fleckenstein | 200/61.21 |
| 4,146,869 A | 3/1979 | Snyder | 73/290 V X |

(List continued on next page.)

FOREIGN PATENT DOCUMENTS

| | | |
|---|---|---|
| CA | 1256301 | 6/1989 |
| CA | 1311032 | 12/1992 |
| DE | 31 07 091 A1 | 1/1982 |
| DE | 38 12 293 C2 | 10/1989 |
| DE | 38 35 406 A1 | 4/1990 |

(List continued on next page.)

OTHER PUBLICATIONS

Hugo Lang and Wolfgang Lubcke, "Smart Transmitter Using Microwave Pulses to Measure the Level of Liquids and Solids in Process Applications", 1993, pp. 731–742. (Month unavailable).

Popular Science, "Radar on a Chip", Mar. 1995, pp. 3, 107–110, 116 and 117.

(List continued on next page.)

*Primary Examiner*—Daniel S. Larkin
*Assistant Examiner*—Rodney Frank

(57) ABSTRACT

A continuous measurement of the level of contents in a container is effected by a level measuring device functioning in accordance with the transit time principle by means of waves transmitted from a position located above the highest possible contents level onto the surface of the material in the container. A measuring circuit determines the contents level from the transit time of the useful echo reflected from the material surface. In addition, one or more limit sensors are located at the container, each of which furnishes a signal indicating whether the contents level is above or below a level to be monitored by the limit sensor and which is situated between the minimum and maximum contents levels of the container. The measuring circuit receives the output signals of all limit sensors and uses these output signals to check and eventually to correct the contents level measured value determined by the level measuring device. In particular, the measuring result furnished by the level measuring device can be compared with an exact contents level value every time the contents level reaches the level monitored by a limit sensor whereby the level indication of the limit sensor changes its status. In certain cases, a single limit sensor is sufficient for this purpose, which monitors a contents level which is regularly exceeded or undershot in the normal use of the container.

17 Claims, 5 Drawing Sheets

U.S. PATENT DOCUMENTS

| | | | |
|---|---|---|---|
| 4,147,906 A | 4/1979 | Levine | 200/61.2 |
| 4,163,917 A | 8/1979 | Levine | 310/327 |
| 4,255,859 A | 3/1981 | Klieman | 33/126.6 |
| 4,365,509 A | 12/1982 | Cornelis | 73/290 V |
| 4,392,032 A | 7/1983 | Roach, II | 200/61.21 |
| 4,400,976 A | 8/1983 | Blades | 73/290 V |
| 4,484,156 A | 11/1984 | Khanna et al. | 331/60 |
| 4,521,778 A | 6/1985 | Knepper | 343/13 R |
| 4,555,941 A | 12/1985 | Fathauer et al. | 73/304 C |
| 4,566,321 A | 1/1986 | Zacchio | 73/290 R |
| 4,596,144 A | 6/1986 | Panton et al. | 73/620 |
| 4,624,139 A | 11/1986 | Collins | 73/304 C |
| 4,661,817 A | 4/1987 | Bekkadal et al. | 324/124 |
| 4,675,854 A | 6/1987 | Lau | 367/908 |
| 4,676,099 A | 6/1987 | McGookin | 73/290 B |
| 4,676,100 A | 6/1987 | Eichberger | 73/304 C |
| 4,677,646 A | 6/1987 | Dodds et al. | 375/36 |
| 4,683,446 A | 7/1987 | McDonald | 331/47 |
| 4,695,685 A | 9/1987 | Fleckenstein | 200/61.21 |
| 4,700,569 A | 10/1987 | Michalski et al. | 73/290 V |
| 4,794,372 A | 12/1988 | Kazahaya | 340/870.16 |
| 4,800,755 A | 1/1989 | Fathauer et al. | 73/304 C |
| 4,910,878 A | 3/1990 | Fleckenstein et al. | 33/719 |
| 4,972,386 A | 11/1990 | Lau | 367/9 |
| 5,048,335 A | 9/1991 | Marsh et al. | 73/304 C |
| 5,088,325 A | 2/1992 | Eichberger et al. | 73/304 C |
| 5,095,748 A | 3/1992 | Gregory et al. | 73/290 V |
| 5,105,662 A | 4/1992 | Marsh et al. | 73/299 |
| 5,150,334 A | 9/1992 | Crosby | 367/98 |
| 5,161,411 A | 11/1992 | Cruickshank | 73/293 |
| 5,164,555 A | 11/1992 | Brenton | 200/61.21 |
| 5,164,606 A | 11/1992 | Secord | 250/577 |
| 5,207,101 A | 5/1993 | Haynes | 73/597 |
| 5,223,819 A | 6/1993 | Marsh et al. | 340/617 |
| 5,245,873 A | 9/1993 | Fathauer et al. | 73/304 C |
| 5,254,846 A | 10/1993 | Fayfield | 250/205 |
| 5,277,054 A | 1/1994 | Campbell | 73/1 H |
| 5,309,763 A | 5/1994 | Sinclair | 73/290 |
| 5,337,289 A | 8/1994 | Fasching et al. | 367/140 |
| 5,345,240 A | 9/1994 | Frazier | 342/28 |
| 5,345,471 A | 9/1994 | McEwan | 375/1 |
| 5,361,070 A | 11/1994 | McEwan | 342/21 |
| 5,457,990 A | 10/1995 | Oswald et al. | 73/290 V |
| 5,465,094 A | 11/1995 | McEwan | 342/28 |
| 5,609,059 A | 3/1997 | McEwan | 73/290 R |
| 5,672,975 A | 9/1997 | Kielb et al. | 324/644 |

FOREIGN PATENT DOCUMENTS

| | | |
|---|---|---|
| DE | 41 26 063 A1 | 2/1992 |
| DE | 43 07 635 A1 | 9/1993 |
| DE | 93 09 651.8 | 11/1993 |
| EP | 0 042 186 | 12/1981 |
| GB | 2 081 452 | 2/1982 |
| GB | 2225113 | 5/1990 |
| GB | 39 04 824 A1 | 8/1990 |
| GB | 2290142 | 12/1995 |

OTHER PUBLICATIONS

"Control Devices and Systems", *Control Engineering*, Jul. 1984, p. 68.

Bindicator Company, Brochure, "Cap–Level II Series", May 1992 two pages.

J. Kehrbeck et al., "Planar Microwave Doppler Senso5rs for Car Speed Monitoring", EuMC 1991 Workshop, Stuttgart, Germany, Nov. 13, 1991, pp. 129–134.

*News Release*: May 1991, "Continuous Radio Frequency Level Sensor for Liquids," located in computer database search.

*News Release*: May 1989, "Continuous Level Sensor Provides Accuracy", located in computer database search.

*News Release*: Sep. 9, 1988, "Display Converts Analog Signal to Visual Readout", located in computer database search.

*News Release*: Jul. 7, 1988, "Remote Level Sensor Offers Easy Calibration", located in computer database search.

*News Release*: Apr. 1988, "Radio Frequency Level Control with F.E.A.T.", located in computer database search.

*News Release*: Oct. 30, 1987, No. 00173326, located in computer database search.

*New Product Announcement*: Jun. 1987, No. 0165416, located in computer database search.

*New Product Announcement*: Jun. 8, 1987, No. 0164492, located in computer database search.

*New Product Announcement*: Jun. 1987, No. 0163995, located in computer database search.

*New Product Announcement*: Feb.1987, No. 0152828. located in computer database search (2 pages).

*New Product Announcement*: Dec. 22, 1986, No. 0148685, located in computer database search.

*New Product Announcement*: Jul. 1986, No. 0135139, located in computer database search.

*New Product Announcement*: Aug. 1985, "A Yo–Yo That Offers Safe and Reliable Level Control", located in computer database search (2 pages).

*New Product Announcement*: Sep. 1985, No. 0116075, located in computer database search.

*New Product Announcement*: Jun. 1985, No. 101134, "Rf–10000 Series", located in computer database search.

*New Product Announcement*: Jun. 1985, No.101132, "RF–7000", located in computer database search.

Advertisement, "Wave Radar, " *Level Transmitters*, Dec. 1992, pp. 14 and 15.

Kenneth Greywall, "Understanding Two–Wire Transmitters", Plant Engineering Magazine, Oct. 1, 1984, vol. 38, No. 23, pp. 2, 76–79.

Merrill Skolnik, "Introduction to Radar Systems", pp. 68–100 (Chapter 3: CW and Frequency–Modulated Radar), 1988.

"LB 432 Level Guage, FMCW–Radar for Continuous and non–Contact Level Measurement", EG&G Berthold News (no date), 4 pages.

Douglas L. Duncan, "Ultrasonics in Solid Level Measurement". Advances in Instrumentation and Control, 46 (1991) Part 2, Research Triangle Park, North Carolina, pp. 1355–1366.

*New Product Announcement*: Jan. 1987, No. 0153579, located in computer database search.

*New Product Announcement*: Jun. 10, 1987, No. 0156975, located in computer database search.

Robert Rosenberg and Tom Crumlish, "Two–Wire Field–Mounted Transmitters: Advantages and Problems", Advances in Instrumentation, vol. 40, Part 2, Proceedings of the ISA/85 International Conference and Exhibit, Oct. 21–24, 1985, pp. 1123–1128.

John L. Daniewicz, "Using Radar Level Measurement For Increased Environmental Protection and Plant Safety" Advances in Instrumentation and Control 46 (1991) Part 2, Research Triangle Park, North Carolina, pp. 1201–1212.

"Transmitters", Plant Engineering, Jul. 26, 1990, pp. 295–296.

Jurgen Kehrbeck et al., "A Novel and Inexpensive Short Range FM–CW Radar Design", International Conference of Radar 1992, Brighton, UK, Oct. 12–13, 1992, pp. 288–291.

ARRANGEMENT FOR MEASURING THE
LEVEL OF CONTENTS IN A CONTAINER

This is a continuation of application Ser. No. 08/388,737 now U.S. Pat. No. 6,047,598 filed Feb. 15, 1995.

FIELD OF INVENTION

The invention relates to an arrangement for measuring the level of contents in a container.

BACKGROUND OF THE INVENTION

When measuring contents levels a difference is made between devices measuring the contents level continuously, which can give a measured value at all times of the current contents level in the container, and limit sensors, which only display whether the contents level in the container is above or below a predefined level to be monitored by the limit sensor. Such limit sensors are especially used for monitoring a maximum or minimum contents level in order to prevent overfilling or underfilling of the container. Different types of limit sensors are known, for example capacitive or resistive limit sensors, which respond to the electrical properties of the material in the container, limit sensors with oscillating elements, such as membranes or vibrating rods, whose vibrations are damped by the material in the container or whose self-resonant frequency is modified by the material in the container, etc. The selection of the limit sensor used depends on the properties of the material in the container and on the application conditions. In each case, a limit sensor gives an electrical signal which has a first signal value when the contents level is below the level to be monitored, and which has a different second signal value when the contents level is above the level to be monitored. The signal changes its signal value at exactly the moment the contents level passes the level to be monitored through addition of material to or removal of material from the container. With several types of limit sensors the signal value depends on whether the limit sensor is in contact with the material in the container or not; with such limit sensors the predefined level of contents monitored by the limit sensor corresponds to the level of installation of the limit sensor.

DESCRIPTION OF THE PRIOR ART

DE 39 04 824 A1 discloses a level measuring arrangement which on the one hand has a mechanical level measuring device, e.g. with a float-operated transmission linkage, for the continuous measurement of the contents level, and on the other hand an electrical limit sensor for limiting the maximum permissible contents level. When the contents have reached the maximum permissible level, the limit sensor gives an electrical signal which triggers an electronically controlled automatic level limiter irrespective of the contents level indicated by the mechanical level measuring device, and for example interrupts the filling of the container. In this way, overfilling of the container is prevented also in case of a defect or inaccuracy in the mechanical contents level measuring device.

On the other hand, continuously measuring contents level measuring devices which are distance meters working according to the transit time principle are also known. Thus a device is disclosed in U.S. Pat. No. 5,309,763 for continuous measurement of the level of a liquid in a container; this device has a tube which extends upwardly from the bottom of the container and which is filled with liquid, whereby the level inside the tube is identical with the level outside the tube. A number of reflectors are mounted along the length of the tube. At the lower end of the tube is a transceiver unit which emits ultrasonic pulses upwards through the liquid in the tube and receives the ultrasonic pulses reflected from the submerged reflectors and from the liquid surface. A measuring circuit calculates the level of the liquid from the difference between the arrival times of the ultrasonic pulses reflected from the two uppermost submerged reflectors and the difference between the arrival times of the ultrasonic pulses reflected from the surface of the liquid and the uppermost submerged reflector. In this way, measurement is independent of changes in the acoustic properties within the liquid, in particular material and temperature-related changes in the sonic velocity. The use of a tube on the one hand results in a concentration of the ultrasonic waves on a small area of the liquid surface, and on the other hand prevents the influence of interfering reflections and external sources of interference.

A level measuring device disclosed in U.S. Pat. No. 5,095,748 is designed very similarly, but with the difference that two parallel tubes are provided, one of which contains the reflectors, while the other tube is used for the measurement of the transit time to the liquid surface; each of the two tubes is equipped with its own transceiver unit for ultrasonic waves.

A precondition for this prior art technique is that a tube is fixed in the container extending more or less over the whole height of the container. This represents no problem in small containers, such as fuel tanks in vehicles or airplanes, but often proves to be difficult or impossible in large containers. Another precondition for this prior art technique is that the transceiver units for the waves used for the transit time measurement are located at the lower end of the tube and are thus exposed to the liquid in the container, which is not possible with aggressive or very hot materials. A final precondition for this prior art technique is that the waves are transmitted through the liquid, which in many cases is only possible with the use of ultrasonic waves, but not with the use of very short electromagnetic waves (microwaves), such as are increasingly used for level measurement according to the transit time principle.

The difficulties arising in the technique described above are avoided in a level measuring device disclosed, for example, in U.S. Pat. No. 4,972,386, which also works according to the transit time principle, but where the waves are directed downwards from a position above the highest level of the material in the container onto the surface of the material in the container. In this case the transmitted waves as well as the reflected echo waves do not go through the material in the container, but through the air located above the material in the container, and the transceiver unit is not in direct contact with the material in the container. The waves used to measure the transit time can be microwaves or ultrasonic waves. In both cases the distance between the level measuring device and surface of the material in the container results from the transit time of the waves corresponding to the useful echo reflected from the surface of the material in the container. The contents level can be calculated directly from this distance.

With this method, a precondition for correct contents level measuring is that the useful echo is unequivocally identified from the total of the echo waves received. For this purpose it is usual to form an echo function from the echo waves received representing the amplitudes as a function of distance. Under ideal conditions, this echo function shows an absolute maximum, the position of which represents the useful echo and thus the desired distance between the level measuring device and the surface of the material in the container. In practice, however, interference occurs, and this makes the evaluation of the echo function difficult or even impossible. First of all, the noise background in the close range is considerably higher. With ultrasonic units this is due to the dying out of the electro-acoustical transducer, and with microwave units it is due to multiple reflections in the area of the signal input and of the antenna. Furthermore, echoes are produced not only on the surface of the material in the container but also on other reflecting structures in the beam path. Particularly with level measurement in containers, significant interfering echoes occur as a result of reflections from container walls, weld seams and built-in components such as tubes, heating elements, limit sensors etc., and the useful echo must be distinguished from these. In particular it is not possible to assume that the useful echo is identical with the absolute maximum of the echo function.

OBJECTS AND SUMMARY OF THE INVENTION

It is an object of the invention to permit automatic checking of the measured result and, if necessary, the elimination of a measuring error in an arrangement suitable for continuous measurement of the contents level in a container in accordance with the transit time principle, irrespective of the size of the container and the type and properties of the material in the container.

The invention offers a solution to this problem by providing an arrangement for measuring the contents level in a container comprising a level measuring device for continuously measuring the contents level and which is a distance meter functioning in accordance with the transit time principle, which has a contents level sensor which transmits waves from a position located above the highest possible contents level to the surface of the material in the container, receives the echo waves reflected from the surface of the material in the container, and delivers an electric output signal representing the echo waves, and which has a measuring circuit which determines the useful echo reflected from the surface of the material in the container from the output signal of the contents level sensor and determines the measured value of the contents level from the transit time of the useful echo, and comprising at least one limit sensor located at the container to supply an electrical signal indicating whether the contents level in the container is greater or smaller than a contents level to be monitored by the limit sensor and which is located between the minimum and maximum contents level of the container, the measuring circuit receiving the output signal of the or of each limit sensor, and using this to check the measured contents level value determined by the level measuring device.

With the arrangement according to the invention, a continuous plausibility check of the measuring result of the continuous contents level measurement can be carried out on the basis of the contents level displays of one or of several limit sensors, and this check is the more accurate the greater the number of limit sensors used is. Furthermore, each time the contents level in the container changes, each limit sensor gives an exact contents level measured value when the contents level is identical with the level to be monitored by the limit sensor. A comparison of this measured value with the measured value supplied simultaneously by the level measuring device can show whether there has been a measuring error, and when a predefined error limit is exceeded, measures can be initiated to eliminate the measuring error, or a warning or error message can be displayed. This allows the field of application of continuously measuring level measuring devices to be extended and the measuring reliability to be increased under difficult application conditions.

A first embodiment of the invention consists in that several limit sensors are arranged at the container to monitor different levels of contents, and at every status change of the output signal of a limit sensor occurring when the contents level reaches the level to be monitored by this limit sensor, the measuring circuit compares this level with the contents level measured value supplied at the same time by the level measuring device in order to check the correctness of the measurement carried out by the level measuring device.

When the measuring circuit forms an echo function from the output signal of the contents level sensor representing the echo amplitudes as a function of the distance over the whole measuring range, and compares each current echo function with a stored empty echo function recorded with an empty container in order to determine the useful echo corresponding to the echo waves reflected from the surface of the material in the container, then the arrangement is preferably designed in such a way that each time the level comparison results in an error exceeding a given error limit, the measuring circuit actualizes the empty echo function from above to the level which is to be monitored by the limit sensor whose output signal has changed its status.

In this first embodiment it is also possible to make provision that every time the output signal of a limit sensor changes its status the measuring circuit actualizes the stored empty echo function from above to the level to be monitored by this limit sensor, irrespective of the result of the level comparison.

A further development of this first embodiment consists in that the measuring circuit actualizes the stored empty echo function at predefined intervals in the range of the limit sensors whose output signals indicate that the contents level is below the levels to be monitored by them.

Furthermore it is possible to make provision that for determining the useful echo the measuring circuit evaluates only that part of the current echo function situated in the range between the levels to be monitored by two limit sensors, one level sensor of which indicates that the contents level is above the level to be monitored by it, and the other level sensor of which indicates that the contents level is below the level to be monitored by it.

Finally, an advantageous modification of this first embodiment consists in that the measuring circuit checks to see whether the measured level value supplied by the level measuring device is situated in the range between the levels to be monitored by two limit sensors, one level sensor of which gives a signal indicating that the contents level is above the level to be monitored by it, and the other level sensor of which gives a signal indicating that the contents level is below the level to be monitored by it.

A second embodiment of the invention consists in that one limit sensor is located at the container, and at each change in status of the output signal of the limit sensor occurring when the contents level reaches the level to be monitored by the limit sensor, the measuring circuit compares this level with the contents level measured value simultaneously supplied by the level measuring device, in order to check the correctness of the measurement carried out by the level measuring device.

When the measuring circuit forms an echo function from the output signal of the contents level sensor representing the echo amplitudes as a function of the distance over the entire measuring range, and compares each current echo function with a stored empty echo function recorded with an empty container in order to determine the useful echo corresponding to the echo waves reflected from the surface of the material in the container, then the arrangement is preferably designed in such a way that the measuring circuit actualizes the empty echo function from above to the level to be monitored by the limit sensor every time the level comparison results in a measuring error exceeding a given error limit.

In this second embodiment it is also possible to make provision that the measuring circuit actualizes the stored empty echo function from above to the level to be monitored by the limit sensor, irrespective of the result of the level comparison, every time the output signal of the limit sensor changes its status.

Further features and advantages of the invention can be seen from the following description of exemplary embodiments on the basis of the drawings.

DETAILED DESCRIPTION OF THE INVENTION

Figure 1:
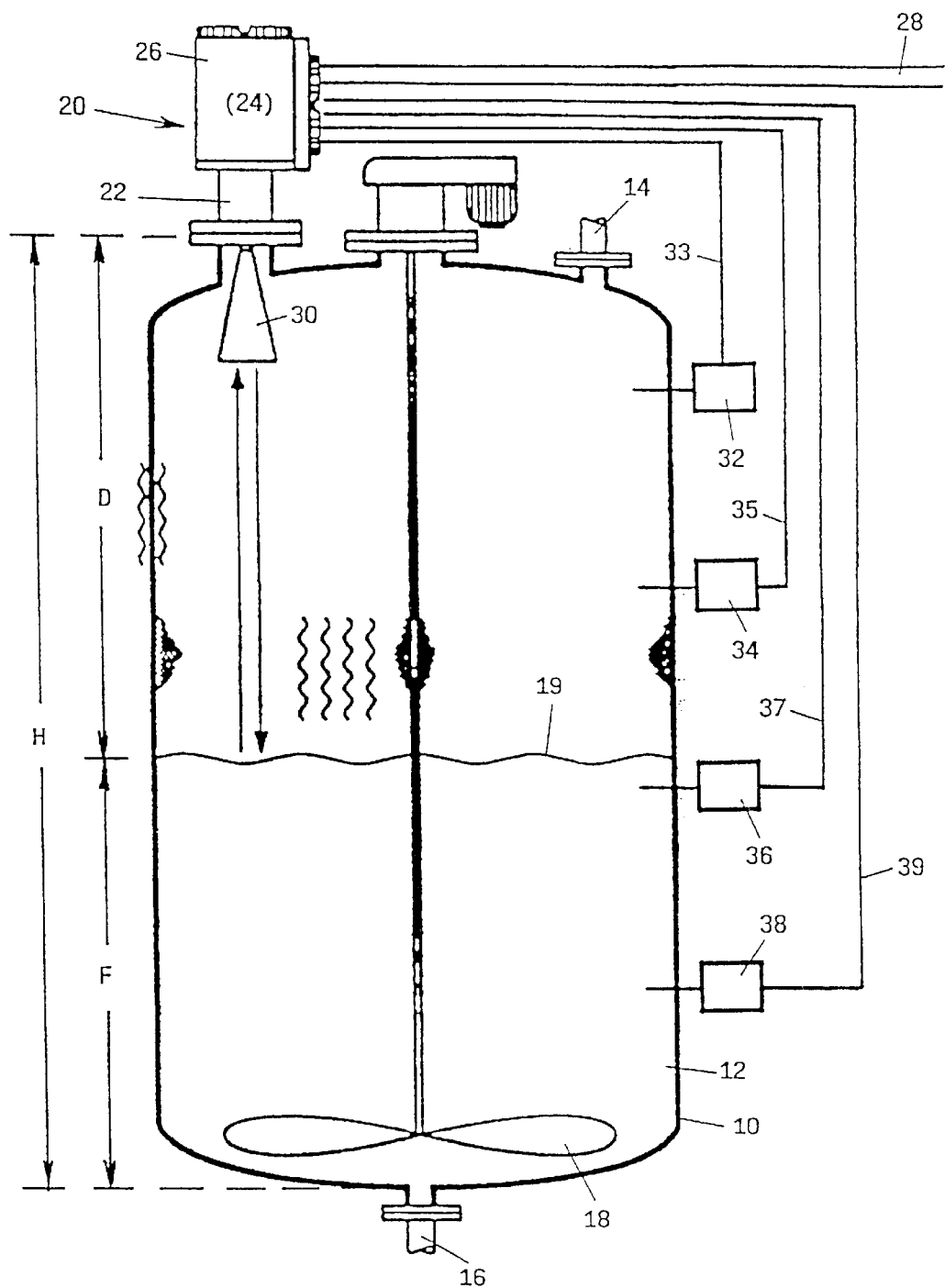
FIG. 1 shows a diagrammatic view of an arrangement for measuring the contents level in a container in accordance with the invention.

FIG. 1 of the drawing shows a container 10 which is partly filled with a material 12. The container is equipped with an inlet 14 for feeding material into the container and an outlet 16 for removing material from the container. The container may be fitted with other devices familiar to the man skilled in the art, depending on the type of material, for example with motor-driven stirring tools 18. The level F is the height of the surface of the material in the container 19 above the lowest point of the container. This level changes as material is added to the container and as material is removed from the container.

For the continuous measurement of the contents level in the container 10, a level measuring device 20 operating according to the transit time principle is located at the container above the highest possible contents level. The level measuring device 20 comprises a contents level sensor 22 which transmits waves to the material surface 19 and receives the echo waves reflected from the material surface 19, and an electronic measuring circuit 24, which is located in a a casing 26 mounted on the upper side of the container and which receives electrical signals from the contents level sensor 22. The measuring circuit 24 measures the transit time of the waves from the contents level sensor 22 to the surface 19 of the material in the container and back to the contents level sensor. Since the propagation speed of the waves is known, the transit time yields two times the distance D of the material surface from the contents level sensor 22, and finally the contents level F can be calculated as the difference between the known installation height H of the contents level sensor 22 and the measured distance D:

$F = H - D$

The measuring circuit 24 is connected to a remote evaluation station 25 by a two-wire cable 28; via this two-wire cable 28 it supplies an electrical measuring signal, which can for example be a current signal variable between 4 and 20 mA in accordance with a known standard, to indicate the contents level. In the evaluation station 25 the measuring signal can be used to indicate the contents level as well as to trigger switching operations which for example can regulate the filling or emptying of the container 10. The level measuring device 20 can be supplied with electrical energy from the evaluation station 25 via the same two-wire cable in accordance with a known technique.

This transit time principle and the contents level sensors and evaluation circuits used for its implementation are generally known; therefore they do not need to be described in detail. The transit time principle has the advantage that the contents level sensor 22 does not have to come into contact with the material in the container 12. The waves can be very short electromagenetic waves (microwaves) or ultrasonic waves. In most cases the waves are transmitted in the form of short pulses, so that the echo waves received also have the form of short pulses; however, transit time processes are also known which work according to the continuous wave principle.

The design of the contents level sensor 22 naturally depends on the type of waves used. In the illustrated example version, the contents level sensor 22 has a horn antenna 30, which indicates that it is designed for the transmission and reception of very short electromagnetic waves. The contents level sensor 22 accordingly has a transmitting generator which produces electrical oscillations with the frequency of the transmission waves which are passed on to the horn antenna 30, as well as a reception circuit which amplifies the echo waves received with the same frequency. A contents level sensor for the transmission and reception of ultrasonic waves would have an electro-acoustical transducer for converting the electrical transmission signal into ultrasonic waves and for transmitting these ultrasonic waves, and would use the same or a similar transducer to convert the ultrasonic echo waves received into an electrical reception signal. Since the component parts just mentioned of such contents level sensors are generally known to the man skilled in the art they are not shown in the drawing and do not need to be described in any more detail.

To determine the transit time of the waves, an echo function representing the echo amplitudes as a function of distance is usually formed in the measuring circuit 24 from the echo waves received. Under ideal conditions this echo function shows an unequivocal absolute maximum, the position of which represents the desired distance D between the level measuring device and the surface of the material in the container.

Figure 2:
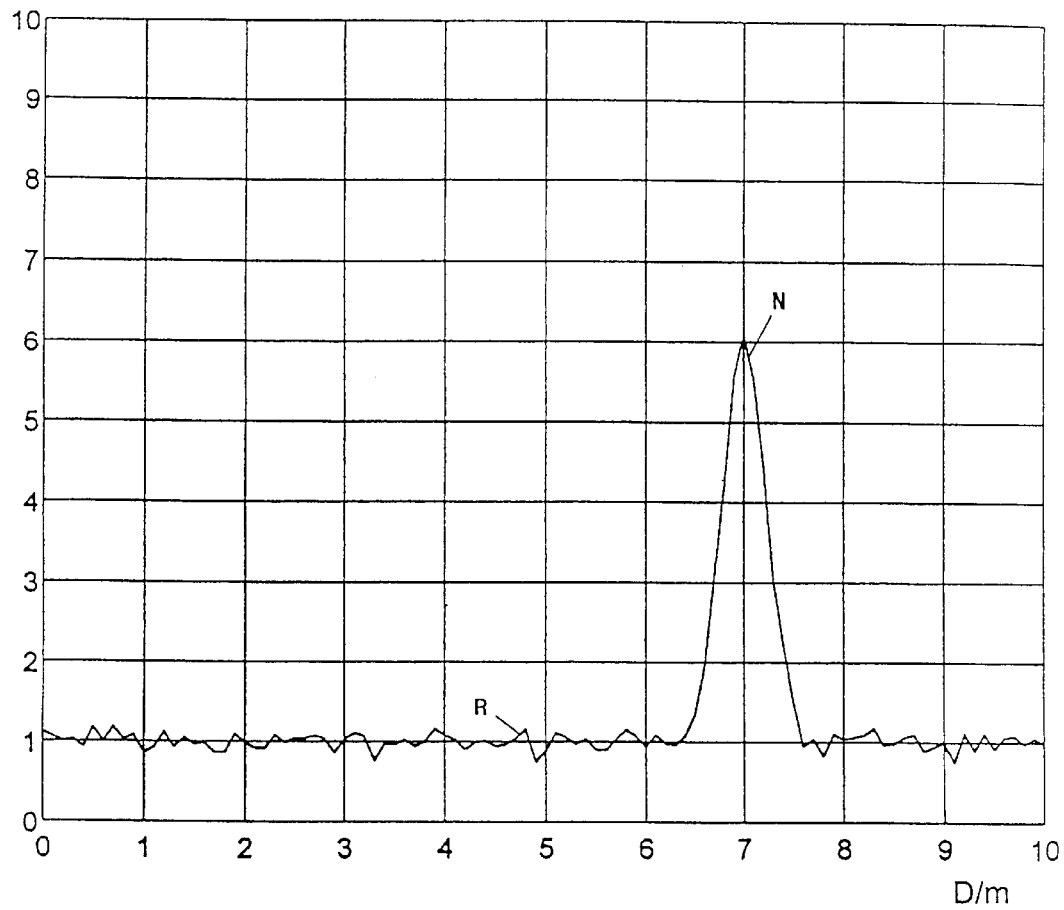
FIGS. 2, 3 and 4 show diagrams to illustrate the functioning of the level measuring device used in the device shown in FIG. 1.

FIG. 2 represents such an ideal echo function, in which only one significant peak N rises above an existing noise level R and which can unequivocally be identified as a useful peak. In this illustration, as well as in FIGS. 3 and 4, the distance D is entered on the abscissa in metres (m) and the signal amplitudes are entered on the ordinate in arbitary units. Under realistic conditions, however, interferences occur, and these can make the evaluation of the echo function difficult or even impossible. These include the following effects:

The noise background is not constant but considerably raised in the close range. With ultrasonic sensors this is due to the dying out of the electro-acoustical transducer after the end of the transmission pulse, and with microwave sensors it is due to multiple reflections in the area of the signal input and of the antenna.

Each reflecting structure in the beam path which diverges lobally with an angle of beam in the magnitude of 10 to 30 degrees due to a finite directional characteristic produces an echo. Particularly when measuring contents levels in containers, additional significant peaks are produced by the container walls, weld seams and structures such as tubes, heating elements, limit sensors etc., and these must be distinguished from the useful peak. In particular one cannot proceed from the assumption that the absolute maximum of the echo function is certainly the useful peak.

Figure 3:
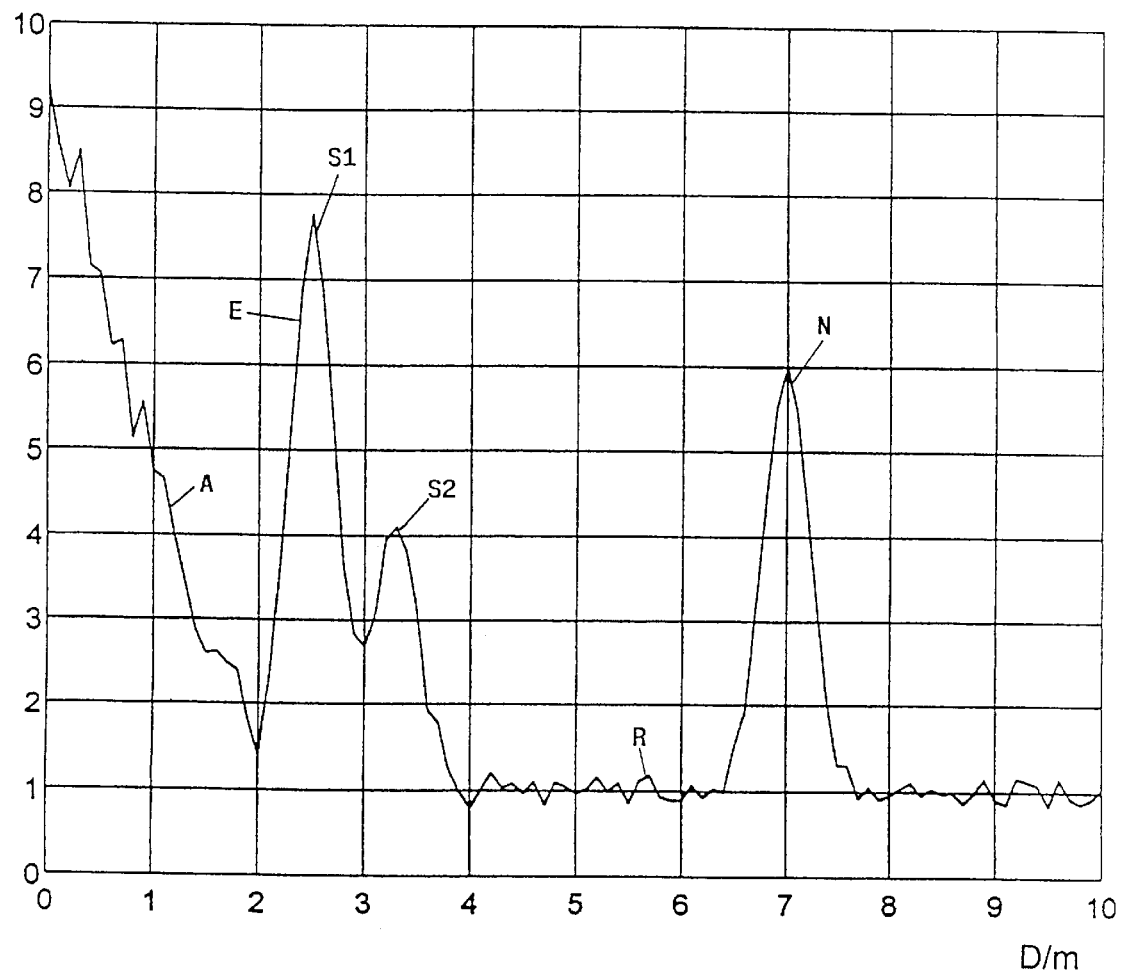

FIG. 3 illustrates such a real echo function E. In the range from 0 to 2 metres there is a descending ramp A; at 2.5 m and 3.3 m there are interfering echoes S1, S2, which are caused by incorporated structures. The useful echo N at 7 m is smaller than the interfering echo S1 at 2.5 m and is also smaller than noise spikes located on ramp A. The useful echo N here is therefore not identical with the main maximum of the echo function.

According to the state of the art, this problem is solved by recording and storing the echo function of the empty container ("empty echo function") and using it for further evaluation in measuring operations. By comparing the current echo function with the stored empty echo function it is possible to determine which peaks must be ignored as interfering echoes.

Figure 4:
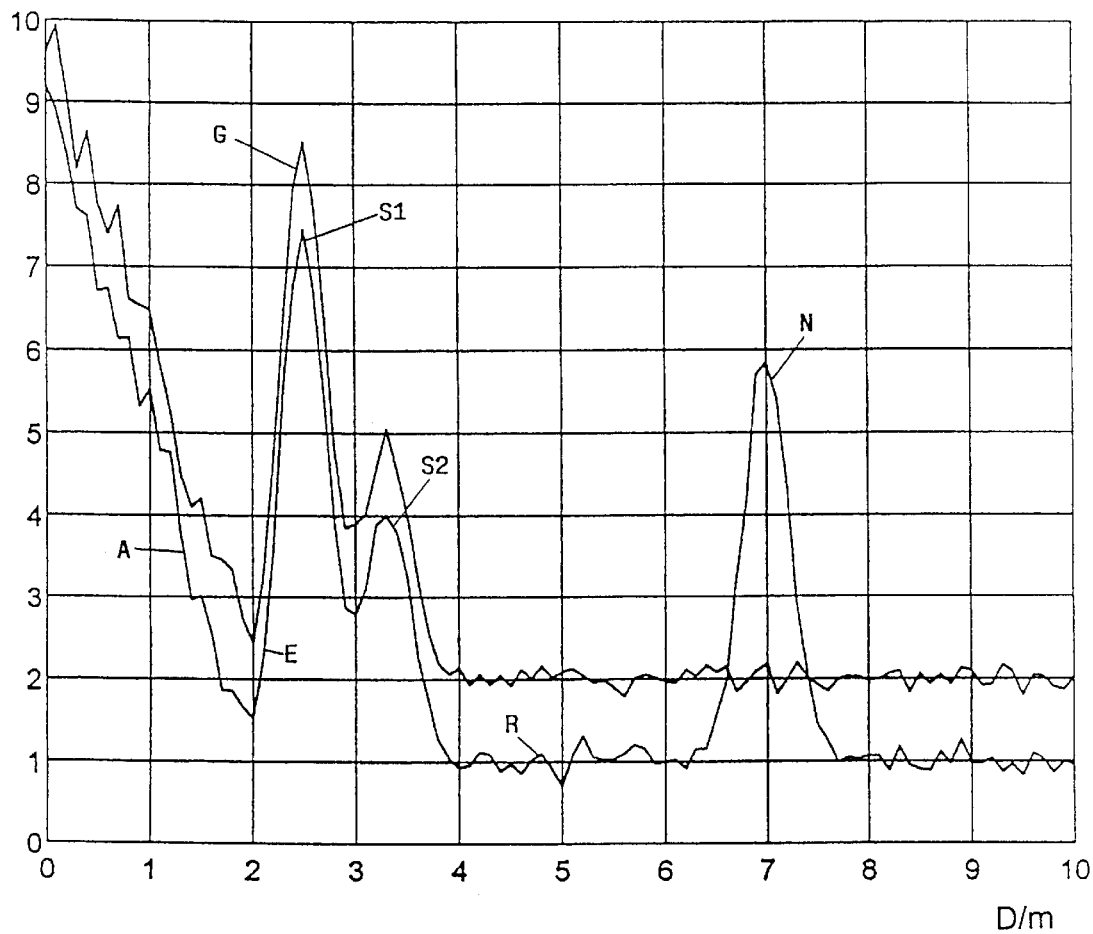

For example, it is possible, as represented in FIG. 4, to define a limit curve G by adding a constant to the empty echo function. The current echo function E does not differ from the empty echo function in the initial portion. Of the current echo function, only those peaks located above the limit curve G are evaluated. In the illustrated example this only applies to the useful peak N at 7 m.

This method in accordance with the state of the art fails, however, under practical conditions when the empty echo function changes in the course of time, for example through deposits of material on the container wall or on the sensor;

when the empty echo function depends on whether the inside of the container is wet or dry, for there can be great differences in the empty echo functions of a dry and of a wet container;

when the interfering echoes from internal structures vary during filling and emptying;

when multiple reflections develop and focussing effects become noticeable depending on the contents level and the container geometry, for in this case the useful echo can be small compared with a multiple reflection and may therefore not be recognised as such;

when time-variant, e.g. periodic, interfering echoes occur, for example from stirring tools;

when the useful echo disappears in a container with a curved container bottom when the container is almost empty, since no signal is reflected in the direction of the sensor;

when the useful signal is too small, e.g. because of a low relative permittivity of the material in the container or because it is absorbed by foam;

when the noise level changes.

In all of these cases it can happen that the limit curve determined on the basis of an earlier empty echo function is no longer practical, so that either a current interfering peak breaks through the limit curve, and is regarded as a useful peak, because the limit curve is too low, or the actual useful peak does not break through the limit curve because this is meanwhile too high. In both cases the measuring device locks on an erroneous measured value.

Moreover, with turbulent surfaces, stirring tools, extreme attenuation of the waves in the gas phase, poorly reflecting materials in the container etc., the useful signal can be attenuated so much that it disappears from time to time and eventually can no longer be reliably identified due to its low level. A random noise peak is then interpreted as a useful peak by the measuring device.

In the case of temporary highly absorbent foam, or signal loss as a result of a curved container bottom when the container is almost empty, no statement about the contents level is possible according to the state of the art.

To remedy the faults described above, four limit sensors 32, 34, 36, 38 are affixed at various heights to the container 10 represented in FIG. 1 in addition to the level measuring device 20. As is well known, a limit sensor is a device which gives an electrical signal indicating whether the contents, level in the container has reached a predetermined height i.e., a predefined level or not. Various types of limit sensors are known, for example capacitive and resistive limit sensors, which respond to the electrical properties of the material in the container, limit sensors with oscillating elements, such as, membranes or vibrating rods, whose vibrations are damped by the material in the container or whose self-resonant frequency is modified by the material in the container, etc. Limit sensors are usually used to monitor the reaching of a critical contents level in the container, for example a maximum level which must not be exceeded, or a minimum level which must not be undershot. The selection of the limit sensor used in each case depends on the properties of the material in the container and on the application conditions. In each case the limit sensor gives an electrical signal which has a first signal value when the contents level is below the level to be monitored, and a different second signal value when the contents level is above the level to be monitored. The signal changes its signal value at exactly the moment the contents level passes the level to be monitored through addition of material to or removal of material from the container. With several types of limit sensors the signal value depends on whether the limit sensor is in contact with the material in the container or not; with such limit sensors the preset level of contents monitored by the limit sensor corresponds to the height of installation of the limit sensor.

Each of these known types is suitable for the limit sensors 32, 34, 36, 38; here too, of course, the type of limit sensor most suitable for the material 12 in question is selected. For a better understanding of this, it is assumed in the following that these are limit sensors where the signal value of the output signal depends on whether the limit sensor is in contact with the material 12 or not. Thus at the illustrated contents level F the output signals of the two upper limit sensors 32 and 34 have the first signal value, because these limit sensors are not in contact with the material 12, while the output signals of the two lower limit sensors 36 and 38 have the second signal value, because these limit sensors are in contact with the material in the container 12. Each limit sensor is connected to the measuring circuit 24 via its own lead 33, 35, 37, 39, so that this measuring circuit receives the output signals of the four limit sensors and can evaluate them as described in the following with respect to interference suppression, plausibility check and self-correction during the continuous contents level measurement carried out by the level measuring device 20.

First of all, the measuring circuit 24 can carry out a plausibility check on the contents level measured by the level measuring device 20 on the basis of the level indicated by the current output signals from limit sensors 32 to 38. In the status shown in FIG. 1, for example, the contents level F is between the predefined level monitored by limit sensor 34 and the predefined level monitored by limit sensor 36. The measuring circuit 24 recognises this status from the fact that the output signal of limit sensor 34 has the first signal value and the output signal of limit sensor 36 has the second signal value. The measured value supplied by level measuring device 20 must therefore be between these two predefined levels; if this is not the case, then measuring circuit 24 recognises that the measured value is erroneous.

In the measuring circuit 24, moreover, the ever-present output signals of limit sensors 32 to 38 can be used to evaluate the reception signals supplied by the level measuring device, in particular to facilitate this evaluation under difficult conditions and to increase protection against errors. As shown in FIG. 1, since it is known from the output signals of limit sensors 34 and 36 that the contents level is in the area between the predefined levels assigned to these limit sensors, the evaluation can be restricted to the part of the echo function coming from this area. With this level, for example, this would mean that in the echo function of FIG. 3, the noise spikes of ramp A and the interfering peaks S1 and S2 would be excluded from the evaluation right from the start, thus, eliminating any risk of one of these noise spikes or interfering peaks being erroneously interpreted as a useful peak.

Apart from this information, which is always available even in stationary condition, limit sensors 32 to 38 always supply considerably more precise contents level information when during changes in the contents level, the contents, level passes the predefined level monitored by a limit sensor, so that the limit sensor in question "switches" and its output signal changes its signal value. This allows the measuring circuit 24 to obtain exact information about the current contents level: the current contents level corresponds to the predefined level monitored by the triggering limit sensor. By comparing this predefined level with the measured value being supplied by the level measuring device 20 at the moment of the change in signal valve, it is possible to check to make sure that the level measuring device 20 is working correctly. If the difference between the predefined level and the measured valve values exceeds a given tolerance threshold, then the level measuring device 20 can automatically carry out the following steps to improve its functioning:

The empty echo function of the container is actualized from the starting point of the empty echo function to an intermediate point of the empty echo function corresponding to the predefined level of the switching limit sensor, and an appropriate new limit curve is generated. This allows changes in interfering signals to be compensated for. The decision as to which of the peaks of the echo function represents the useful echo thus becomes unequivocal and correct. A random or periodic actualization of the empty echo function up to the contents level determined by the level measuring device 20, alone, without the help of a limit sensor, would not fulfil the purpose, since this contents level can be wrong, for example when a large interfering peak is formed through deposit formation and when this is erroneously interpreted as a useful peak. Such interfering peaks are suppressed by actualizing the empty echo function as far as the predefined level indicated by a triggering limit sensor.

The actualization of the empty echo function can be carried out most simply by replacing the part to be actualized by the corresponding part of the current echo function recorded for measuring purposes, for the current echo function is identical with the empty echo function in the part located above the surface of the material in the container. A new recording with a partly filled container would result in nothing else than the current echo function.

If no satisfactory agreement between the measured, value supplied by the level measuring device 20 and the predefined level indicated by the triggering limit sensor can be reached in spite of the actualization of the empty echo function, a warning or fault message can be sent to the evaluation station 25 by measuring circuit 24.

Depending on the application of the contents level measuring device, it is also always possible to actualize the empty echo function automatically above the contents level thus displayed, each time a limit sensor is triggered, even if no measuring error is ascertained, or at certain time intervals it is possible to actualize that part of the empty echo function which is in the range of the limit sensors reporting the status "not covered".

If measuring circuit 24 is formed by a suitably programmed microcomputer in accordance with current practice, it can carry out the functions described above through appropriate modifications to the programs without essential changes to the hardware. Only suitable interfaces for the output signals of the limit sensors are required. For the man skilled in the art there is no problem in implementing these interfaces, since these output signals are binary signals anyway and can only have the one or the other of two signal values. Since such circuits and their programming are generally known to the man skilled in the art, detailed illustration and description are not necessary.

The number of limit sensors to be mounted on the container so that the continuously measuring level measuring device can be checked at suitably short time intervals depends on the prevalent operating conditions. If the container is generally completely filled and then emptied in frequently repeated operating cycles, as is usually the case, for example, in the chemical industry and in the food industry, then one single limit sensor may be sufficient to implement all of the functions described above. In this case it is important that the single limit sensor should monitor a contents level which is regularly exceeded or undershot when the container is filled and emptied.

Figure 5:
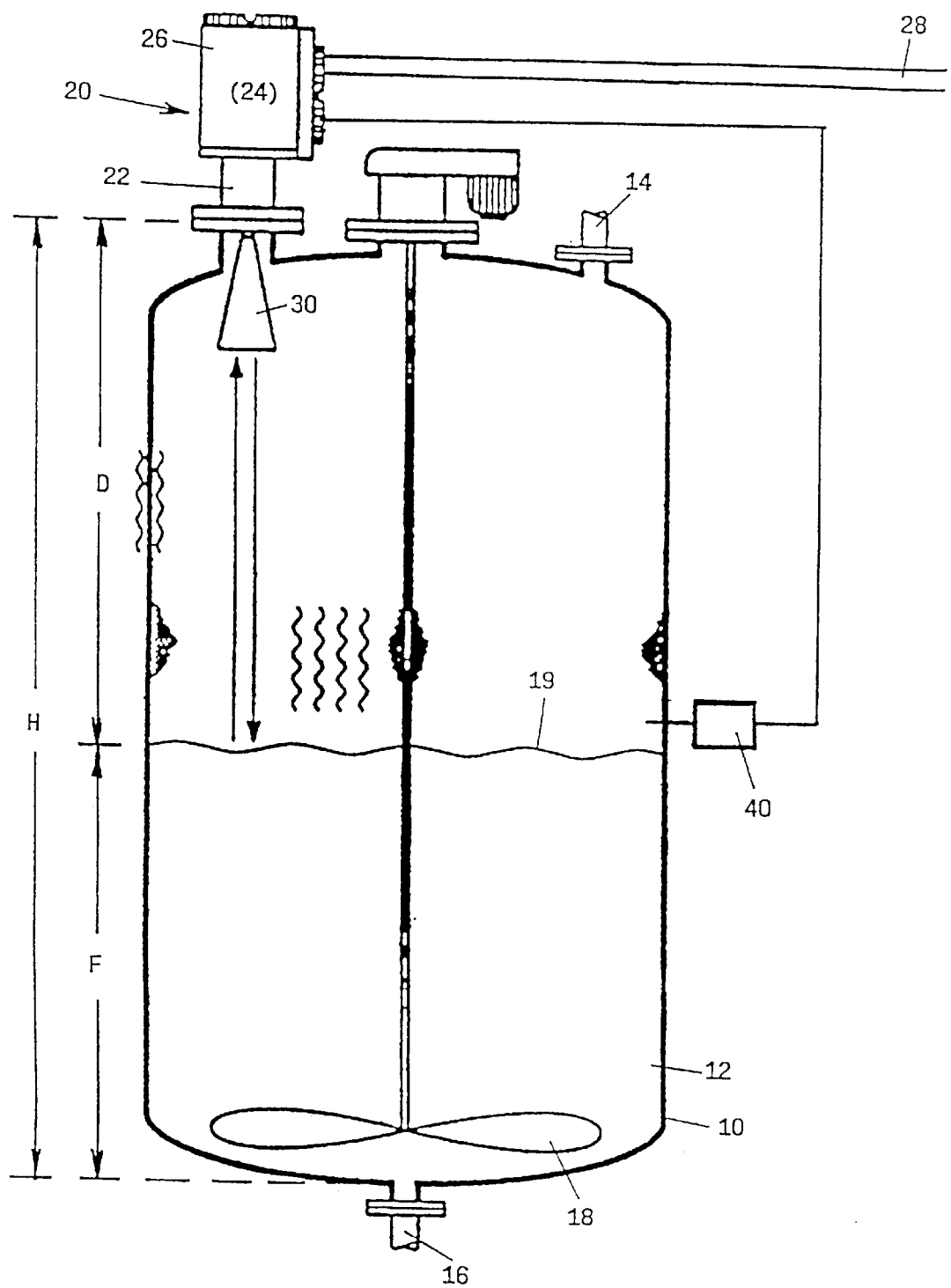
FIG. 5 shows a modified version of the arrangement shown in FIG. 1.

As an example, FIG. 5 shows a modified version of the level measuring device shown in FIG. 1, where only one single limit sensor 40 is located at about the half-way height of container 10, that is in the middle between the minimum and the maximum predefined levels. In this case, the measuring circuit 24 receives the output signal of the single limit sensor 40 to check the continuous level measurement carried out by the level measuring device 20. In this case a continuous plausibility check is also possible: when the limit sensor 40 indicates that the contents level is above or below the predefined level monitored by it, then the measured contents level value supplied by level measuring device 20 must also be in the appropriate range. Furthermore, twice in each operating cycle the limit sensor supplies an accurate contents level value, when the contents level passes the monitored predefined level while the container is being filled or emptied. By comparing this predefined level with the measured value supplied by level measuring device 20 at the same time, it is possible to check whether the level measuring device 20 is working correctly in the same way as in the version shown in FIG. 1, and the measures described above for correcting measuring errors or for displaying a fault may be carried out.

What is claimed is:

1. A two-wire measuring apparatus for measuring the level of the material in a container, the material in the container defining a surface, the apparatus comprising:
- a level sensor mounted at the highest possible level to the container;
- an electromagnetic wave antenna extending from said level sensor into the container;
- a measuring circuit connected to said level sensor; and
- a two-wire process control loop connected to said measuring circuit, wherein
- said process control loop supplies a current signal which is variable between 4–20 ma,
- said level sensor generating electromagnetic waves to be transmitted through said electromagnetic wave antenna to the surface of the material in the container and for receiving from the surface, electromagnetic waves reflected from the surface through said electromagnetic wave antenna, and
- said measuring circuit analyzing said reflected electromagnetic waves, forming thereby an echo function from the output signal of said level sensor representing the echo amplitudes as a function of distance over the whole measuring range, compares a portion of the echo function to a stored empty echo function to determine a measured value of the contents level, and, when triggered, compares the measured value of the contents level to a predefined level and conveys the result to said two-wire process control loop.

2. The two-wire measuring apparatus as defined in claim 1, further comprising:
- a first limit sensor mounted to the container and connected to said measuring circuit to indicate whether the material level in the container is above or below a first predefined level monitored by said first limit sensor.

3. The two-wire measuring apparatus as defined in claim 2, further comprising:
- a second limit sensor mounted to the container and connected to said measuring circuit for monitoring a second predefined level, said first and second predefined levels being within a measuring range of the two-wire measuring apparatus, said first limit sensor supplying a first output signal to said measuring circuit indicating whether the material level in said container is above or below said first predefined level, and said second limit sensor supplying a second output signal to said measuring circuit indicating whether the material level in said container is above or below said second predefined level, wherein at least one of said first and second output signals is used to determine an error in the material level measurement carried out by the two-wire measuring apparatus.

4. The two-wire measuring apparatus as defined in claim 1, further comprising:
- a power supply connected to said two-wire process control loop for providing the sole source of power for said level sensor and said measuring circuit.

5. The two-wire measuring apparatus as defined in claim 1, wherein said measuring circuit includes a microprocessor operable for determining the echo function.

6. The two-wire measuring apparatus as defined in claim 1, wherein the electromagnetic waves are short pulses.

7. The two-wire measuring apparatus as defined in claim 1, wherein the electromagnetic waves are continuous waves.

8. The two-wire measuring apparatus as defined in claim 1, wherein the echo function represents the amplitudes of the electromagnetic waves received by said level sensor as a function of distance over an entire measuring angle for the level of the material in said container.

9. The two-wire measuring apparatus as defined in claim 1, wherein said measuring circuit determines a corresponding empty echo function representing amplitudes of electromagnetic waves received by said level sensor as a function of distance when said container contains approximately none of the material, comparing the echo function with the corresponding empty echo function to identify a portion of the echo function that is representative of the electromagnetic waves reflected by the surface.

10. The two-wire measuring apparatus as defined in claim 9, wherein the empty echo function is a limit curve.

11. The two-wire measuring apparatus as defined in claim 9, wherein said measuring circuit determines a limit curve by adding a constant to the empty echo function, and evaluates only peaks of the echo function that are located above the limit curve.

12. The two-wire measuring apparatus as defined in claim 9, wherein the empty echo function is actualized by replacing a portion of the empty echo function associated with distances above the level of the material in said container with a portion of the echo function associated with the distance above the level of the material in said container.

13. A two-wire measuring apparatus for measuring the level of the material in a container, the material in the container defining a surface, the apparatus comprising:
- a two-wire process control loop;
- a level sensor mounted at the highest possible level to the container;
- an electromagnetic wave antenna extending from said level sensor into the container;
- a measuring circuit connected to said level sensor;
- a two-wire process control loop connected to said measuring circuit;
- a first limit sensor mounted to the container and connected to said measuring circuit to indicate whether the material level in the container is above or below a first predefined level monitored by said first limit sensor; and
- a second limit sensor mounted to the container and connected to said measuring circuit for monitoring a second predefined level, said first and second predefined levels being within a measuring range of the two-wire measuring apparatus, said first limit sensor applying a first output signal to said measuring circuit indicating whether the material level in said container is above or below said first predefined level, and said second limit sensor supplying a second output signal to said measuring circuit indicating whether the material level in said container is above or below said second predefined level, wherein
    at least of said first and second output signals is used to determine an error in the material level measurement carried out by the two-wire measuring apparatus,
    said process control loop supplies a current signal which is variable between 4–20 ma,
    said level sensor generating said electromagnetic waves to be transmitted through said electromagnetic wave antenna to the surface of the material in the container and for receiving from the surface, electromagnetic waves reflected from the surface through said electromagnetic wave antenna, said measuring circuit analyzing said reflected electromagnetic waves, forming thereby an echo function from which the distance from the surface of the material in the container to said level sensor is determined and conveyed by said two-wire process control group, and when said first limit sensor indicates that the material level is above said first predefined level and said second limit sensor indicates that the material level is below said second predefined level, said measuring circuit compares a portion of a current echo function representing the amplitudes of the electromagnetic waves reflected from the surface as a function of the region between said first predefined level and said second predefined level with a stored empty echo function to determine a useful electromagnetic wave reflected from the surface of the material in said container and to determine a measured value of the material level from the transit time of the useful electromagnetic wave.

14. The two-wire measuring apparatus as defined in claim 13, wherein, when the output signal of one of said first and second limit sensors changes status, said measuring circuit performs a level comparison, comprising the one of said first and second predefined levels with the measured value of the material level determined at the same time by said measuring circuit from the transit time of the useful electromagnetic wave to determine an error of the material level measurement carried out by the two-wire measuring apparatus.

15. The two-wire measuring apparatus as defined in claim 14, wherein each time the error determined in the level comparison exceeds a give error limit said measuring circuit actualizes the stored empty echo function from the starting point of the stored empty echo function to an intermediate point of the stored empty echo function corresponding to the one of said first and second predefined levels monitored by the one of said first and second limit sensors whose output signal changed status.

16. The two-wire measuring apparatus as defined in claim 14, wherein, when the output signal of one of said first and second limit sensors changes its status, said measuring circuit actualizes the stored empty echo function from the starting point of the stored empty echo function to an intermediate point of the stored empty echo function corresponding to the one of said first and second predefined levels monitored by the one of said first and second limit sensors whose output signal changed status.

17. A two-wire measuring apparatus for measuring the level of the material in a container, the material in the container defining a surface, the apparatus comprising:

a level sensor mounted at the highest possible level to the container;

an electromagnetic wave antenna extending from said level sensor into the container;

a measuring circuit connected to said level sensor; and a two-wire process control loop connected to said measuring circuit, wherein said process control loop supplies a current signal which is variable between 4–20 ma, said level sensor generating electromagnetic waves to be transmitted through said electromagnetic wave antenna to the surface of the material in the container and for receiving from the surface, electromagnetic waves reflected from the surface through said electromagnetic wave antenna, and said measuring circuit analyzing said reflected electromagnetic waves, forming thereby an echo function from which the distance from the surface of the material in the container to said level sensor is determined and conveyed by said two-wire process control loop, said measuring circuit evaluating only a portion of the echo function corresponding to distances between two predetermined levels of said container.

* * * * *